United States Patent

Mezick

[19]

[11] Patent Number: 5,872,974

[45] Date of Patent: Feb. 16, 1999

[54] PROPERTY SETTING MANAGER FOR OBJECTS AND CONTROLS OF A GRAPHICAL USER INTERFACE SOFTWARE DEVELOPMENT SYSTEM

[76] Inventor: Daniel J. Mezick, 6 Robin Ct., North Haven, Conn. 06473

[21] Appl. No.: 423,462

[22] Filed: Apr. 19, 1995

[51] Int. Cl.[6] .................................................. G06F 9/45
[52] U.S. Cl. ........................................................ 395/701
[58] Field of Search .................................. 395/701, 703, 395/651, 653

[56] References Cited

U.S. PATENT DOCUMENTS 5,603,034  2/1997  Swanson ................................. 395/701

OTHER PUBLICATIONS

Barkakati, N., "X Window System Programming," Sams Publishing, Carmel, IN, pp. xxix, 266, 417–420, 1991.
Opaque Software/Brett Liddicoet, OXButton software manual, pp. 2–3, Napa CA 94558.

*Primary Examiner*—Emanuel Todd Voeltz
*Assistant Examiner*—Peter J. Corcoran, III
*Attorney, Agent, or Firm*—Kyle S. Brant

[57] ABSTRACT

A GUI software development system that executes in a multitasking environment is enhanced with the addition of a property setting manager program that provides a means whereby a programmer may readily store and retrieve one of a plurality of program object property sets for a particular program object, be the object a visual control or a non-visual object that provides a distinct added functionality to the program. The property setting manager program provides functionality to extract current property settings of a control or object and save those settings as a predefined property set for future use. Predefined property sets are automatically made available to the programmer upon detection of an event indicating a corresponding control or object is being added to a computer program under development. Multiple unique predefined property settings for a particular programming object or control are stored for later recall so that the programming effort required to establish initial property settings is minimized. Further, an edit feature enables property settings of a program object or control to be easily modified to a new or different set of property settings at a later time. Predefined naming prefixes are automatically presented to the user upon detection of the addition of a new program object or control to aid in establishing standardized or preferred personalized reference names for each new program object.

12 Claims, 5 Drawing Sheets

PROPERTY SETTING MANAGER FOR OBJECTS AND CONTROLS OF A GRAPHICAL USER INTERFACE SOFTWARE DEVELOPMENT SYSTEM

FIELD OF THE INVENTION

This invention relates to computer programs and software development systems therefor, and more specifically to Graphical User Interface (hereinafter "GUI") software development programming systems.

BACKGROUND OF THE INVENTION

Some years ago, a young Steve Jobs, one of the cofounders of Apple Computer, visited a facility owned by Xerox Corp. known as PARC (Palo Alto Research Center) and observed an advanced engineering system developed by Xerox. The Xerox system included a graphical interface, icons and a pointing device with switches (well known today as a mouse). The Xerox system was not a commercial success, and largely disappeared. However, the exposure to that system lead Steve Jobs to return to Apple Computer and inspired the creation of the Macintosh GUI.

In the meantime, IBM personal computer (or more widely known as "IBM PC") users were relegated to the command line, text mode display of the then available DOS (Disk Operating System) originally developed for IBM by Microsoft Corporation. With the huge success of the Apple Macintosh computer, IBM PC software companies began a concerted effort to develop similar GUI products for the IBM compatible. Specifically, IBM again returned to Microsoft for software development and the result was the ill-fated OS/1 OS. Further efforts by the two superpowers of the PC world resulted in two well known GUI operating systems presently available for the IBM compatible and known in the trade as Windows® from Microsoft Corporation and OS/2® from IBM (it should be noted that OS/2® was initially developed under contract from IBM by Microsoft Corporation). It is estimated that Windows® Operating System version 3.1 has sold more than 60 million copies worldwide as of this date. The actual user base is more likely larger as a result of illegally installed copies of Windows®.

One of the distinct advantages of a GUI operating system (hereinafter also referred to as "GUI") is a standardized graphical presentation of information and "controls" or user interface objects. Such graphical objects include sizable windows, menus, pushbuttons, scroll bars, checkboxes, radio buttons and the like. User input is received by a GUI program via menus, pushbuttons, list boxes, edit boxes, mouse "clicks" alone or coupled with the "Alt", "Shift" and "Ctrl" keys, keyboard commands and a variety of other techniques well known to those skilled in the art. Programs developed for GUI's have a more consistent appearance, and menu structures have advanced to the point where most software developers adhere to a fairly standard format for common menu command items such as FILE, EDIT, FORMAT, OPTIONS, HELP etc., thereby enabling the user to become more rapidly proficient in using a new GUI based program.

A distinct drawback to GUI based program development was the necessity for programmers to shift from program development wherein the program has exclusive access to the computer hardware to programming in a multi-tasking environment wherein direct access to the hardware is generally not allowed when following recommended programming techniques. I/O (Input/Output) to and from hardware devices is handled by the GUI OS via device drivers, and programs are "event driven" in that the OS sends a program a notification (or message) signaling the occurrence of an event (such as a user clicking the mouse) and the program must respond accordingly, or perhaps ignore the event if so desired.

Initially, developing a GUI based program was a fairly tedious task, and required specific attention to a multitude of details or events that might take place wherein a program must properly respond to the event yet share the resources of the computer with other programs executing in the GUI environment. Numerous trial and error attempts were required to properly layout the visual appearance of a GUI based program. Eventually, graphical user interface design tools or visual development programming tools evolved to simplify the programmers efforts in developing such software. Yet, the event driven model of GUI programming still required a great deal of knowledge with respect to the internal hardware components of the PC. Then came the Visual Basic® Programming System for Windows® (Visual Basic® and Windows® are registered trademarks of Microsoft Corporation) a program development system that operates in the Windows® operating system (hereinafter Windows® OS).

Visual Basic® (hereinafter VB) is a programming development system from Microsoft Corporation that has revolutionized the program development cycle for GUI based programs. Now in the third version, VB enables the development of very sophisticated programs in a relatively short time span. VB uses the Basic programming language, modified to accommodate the features of GUI programming and the underlying OS. One of the more radical advances provided by VB is the manner in which a programmer designs the visual objects and layout of the appearance of the program without having to execute the program. A programmer, in designing the visual interface of a GUI program with VB, merely selects a new object to be added to the program by moving the mouse pointer and clicking on that item with the mouse, then moves the mouse pointer over the "form" (a visual representation of a GUI window that will be displayed when the program is executed). Next, a click-drag mouse operation adds the object to the program window or form. User interface visual objects are referred to as "controls" in the VB programming environment, and such will be the terminology used throughout this document. A double-click on the control opens up a code window wherein code associated with the events to which the control responds can be inserted by the programmer. Further, VB is extensible in that third party software developers can develop "custom controls" that provide new functionality yet simplify the implementation of such new features or characteristics of the finished program.

Referring now to FIG. 1, a visual representation of the programming environment for VB 1 is shown. Window 10 is the main program window for VB which includes a user accessible menu 10a and a toolbar 10b with graphical pushbuttons 10c located thereon. A brief example of the steps required for adding a "pushbutton" control to a "form" using VB includes: (1) selecting the pushbutton control 11 from the control toolbox window 12 (a collection of icons representing the controls available to the programmer) by clicking on the visual representation of the pushbutton control, (2) click-drag on the form 13 to literally "paint" the control onto form 13, (3) moving the new pushbutton control 14 to the desired location on the form by clicking on the control and moving the mouse pointer to the new location then releasing the mouse button.

A new control may added to a form by simply double-clicking on the control in the toolbox window 12 and the control will be added to the currently active form 13 and positioned in the center of the form. Other techniques, such as copy and paste or cut and paste, may also be used to add a new control to a form.

After the programmer has added the new pushbutton control 14 to the currently visible form in the design environment of VB, the properties of the control must be set. Properties for a pushbutton control include those items listed in the properties window 15, which is a visual representation of the properties window for a pushbutton control. The properties window 15 includes three areas, the object box 15a, the settings box 15b and the properties list 15c. The object box 15a provides a means for selecting the object or control of interest. As shown in the object box 15a, the COMMAND1 CommandButton (or pushbutton) control 14 is currently selected, and its properties are accordingly listed in the properties list 15c.

Each object or control pictorially depicted via pushbuttons with icons in the toolbox 12 has its own unique list of properties that are defined via the properties window 15. As a programmer adds program objects or controls to the form 13, predefined default properties of the object are established automatically by VB and are also shown in the properties window 15. VB initializes the properties to predefined or default settings, yet it is most commonly the case that the default settings are not those desired by the programmer. Thus, as each object or control is added to form 13, the initial run-time properties for the object may be optionally altered by the programmer. Initial properties are those that are automatically activated upon initial execution of the program that includes form 13 and pushbutton 14. The process for changing the properties of a control includes selecting the control 14 so that its properties are visible in the properties window 15, selecting one of the properties in the list 15c, and entering the desired values in the settings box 15b. The settings box 15b is a drop-down list box with edit capabilities that enables selection of settings from a list and, alternatively, allows the programmer to type in the desired property settings using the keyboard. It becomes readily apparent that as the number of controls added to form 13 increases, the time and effort consumed to establish the properties of each control is magnified directly.

With the foregoing in mind, what is needed is a more convenient and time saving technique for establishing the properties of a control or graphical object that forms a part of a computer program designed and developed within a GUI environment software development system.

SUMMARY OF THE INVENTION

A method for establishing alternative property settings of a computer program object, according to one aspect of the present invention, comprises the steps of providing a computer system including a CPU, RAM, ROM, a display, and an input device for receiving input from a programmer, providing a software development system program for use on the computer system for developing a computer program, wherein the software development system program includes a means for adding a plurality of program objects to a computer program, detecting the addition of a program object by the software development system program to the computer program, wherein the program object is assigned a default property set by the software development system, and establishing a predefined property set for the program object wherein the predefined property set defines a collection of operational properties for the program object different from the default property set.

An apparatus for establishing alternative property settings of a computer program object, according to another aspect of the present invention, includes a computer system including a CPU, RAM, ROM, a mass storage device, a display, and an input device for receiving input from a programmer, a software development system program executing on the computer system, wherein the software development system is used in developing a computer program, wherein the software development system program includes a means for adding a plurality of program objects to a computer program, and wherein the computer system includes: means for detecting the addition of a program object by the software development system program to the computer program, wherein the program object is assigned a default property set by the software development system, and means for establishing a predefined property set for the program object wherein the predefined property set defines a collection of operational properties for the program object different from the default property set.

One object of the present invention is to provide an improved computer program development environment.

Another object of the present invention is to reduce the effort required by a programmer in developing new computer programs.

A further object of the present invention is to provide a flexible and configurable program object property manager to establish program object properties rapidly, and to provide multiple property sets readily recalled and made available to initialize the properties of a program object.

Yet another object of the present invention is to provide alternative naming schemes for program objects thereby easing the burden of programming and promoting standardization in the naming of program objects.

These and other object of the present invention will become more apparent from the following description of the preferred embodiment.

DESCRIPTION OF THE PREFERRED EMBODIMENT

Figure 1:
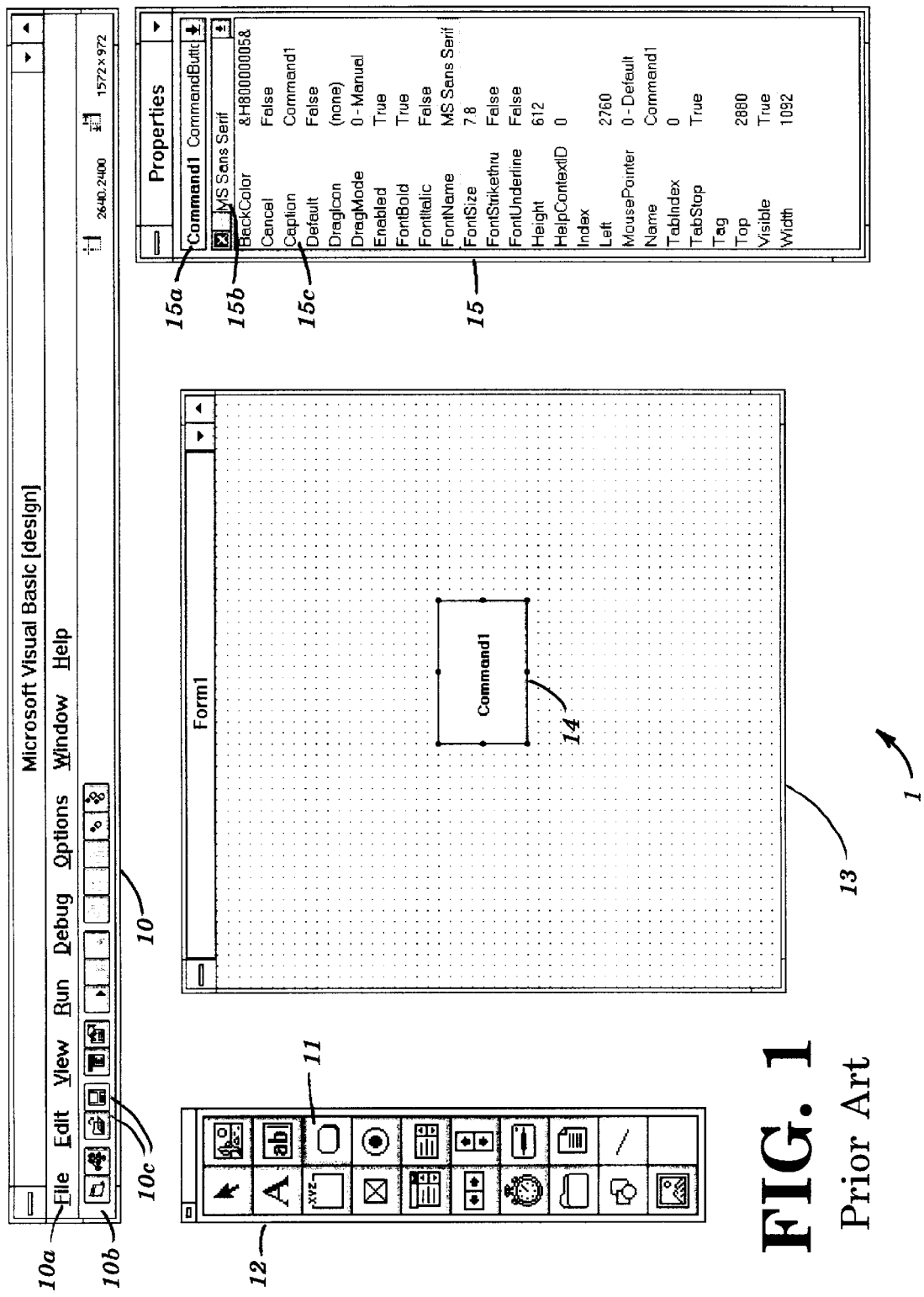
FIG. 1 is a graphical depiction of a software development system program including some of the components of a GUI based software development system and a simple GUI program under development.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
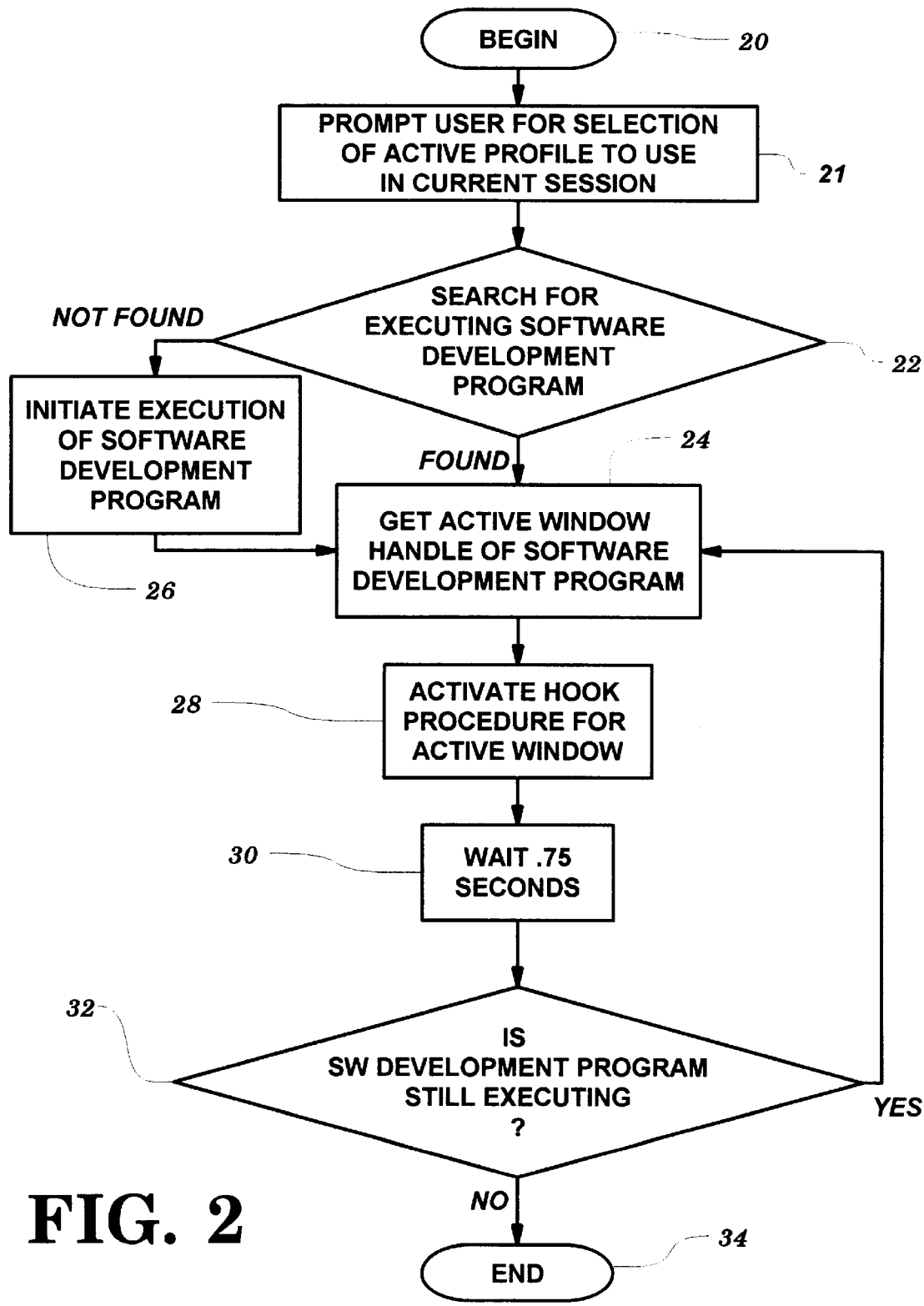
FIG. 2 is a first level flowchart of the program object property manager according to the present invention.

Referring now to FIG. 2, a top level flowchart depicting the operation of a property settings manager program for establishing property settings of program objects (hereinafter manager program), according to the present invention, is shown. Program execution begins at step 20 and thereafter, in step 21, upon initial invocation of the manager program of FIG. 2, the programmer is presented with a list of available property profiles known to the manager program and requested to select one of the available profiles. Each profile contains a collection of predefined property settings for program objects or controls. Such profile information is contained in an INI file (a program settings file type well known in the art of Windows® OS programming) or in a database file. The objective in providing multiple profiles is twofold. First, if more than one programmer uses the manager program, each programmer creates their own profile containing property settings desired for available program objects or controls. Secondly, if the programmer has more than one programming project underway, each programming project may have a corresponding property settings profile created by the user for simplification in predefining property settings unique to each programming project. A sample listing of an INI file for use with the property setting manager invention is included after the description of the preferred embodiment, and is referred to throughout as the "INI file settings" or the "INI file".

Two separate conditions are possible when the manager program is initiated. The software development program, or VB, may already be executing on the host computer (not shown) or such may not be the case. Accordingly, at step 22 following step 21, an inquiry of the Windows® OS is executed to ascertain whether VB is presently loaded and executing. Techniques for accomplishing this inquiry are well known in the art of Windows® OS programming and detailed information regarding such techniques can be found in the Microsoft® Windows® Software Development Kit (hereinafter "SDK") as well as in numerous programming books available on the subject. If VB is executing, program execution continues at step 24. If VB is not executing, VB is "launched" or "spawned" by the property manager program at step 26. After spawning VB, program execution continues at step 24.

In order to communicate with or control a program executing in the Windows® OS environment, a "handle" for the program's main or topmost window is required. A window handle is a numeric value assigned by the Windows® OS that uniquely describes each currently executing program. In order to communicate with or programmatically manipulate another program, a window handle for the main window of that program must first be obtained in step 24. Once the window handle is obtained step 24, the VB program is then "hooked" at step 28. A "hook" enables another program to monitor the messages received by the target or hooked program. The Windows® OS provides a very sophisticated mechanism for communicating with the OS and other programs. Messages are sent by the Windows® OS to inform a program that certain events have transpired (such as a mouse click or a key is pressed on the keyboard). Such is typical in an event driven OS environment. All Windows® OS programs operate in this fashion, wherein a message received from the OS triggers a possible response from the program. By "hooking" the VB program, the property manager program can inspect messages received by VB before VB receives the messages and act in response to selected messages. The particular messages of importance will be discussed subsequently with respect to the discussion of FIG. 3.

Following step 28, the manager program waits a predetermined period of time, 0.75 seconds, at step 30. Thereafter, at step 32, it is determined whether VB is still executing. Again, OS calls to accomplish this task are well known. If VB is no longer executing then the program ends at step 34. If VB is still executing, program execution continues at step 24 and the current active window of VB is ascertained. The active window of VB is a critical piece of information in that detection of the addition of a new program object or visual control to a form is the event that triggers the manager program. To successfully intercept the addition of a control or object to a form window, the active VB window must be monitored and updated periodically.

Figure 3:
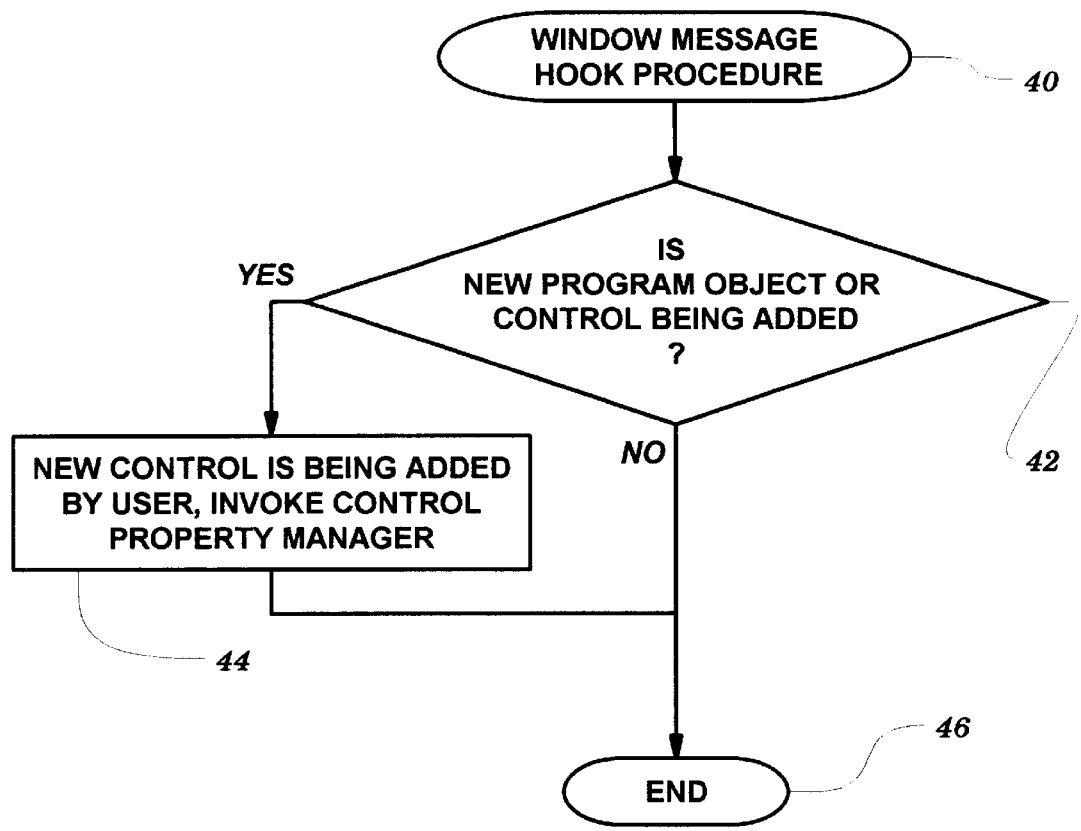
FIG. 3 is a flowchart of the software hook procedure (block 28) of FIG. 2.
Figure 4:
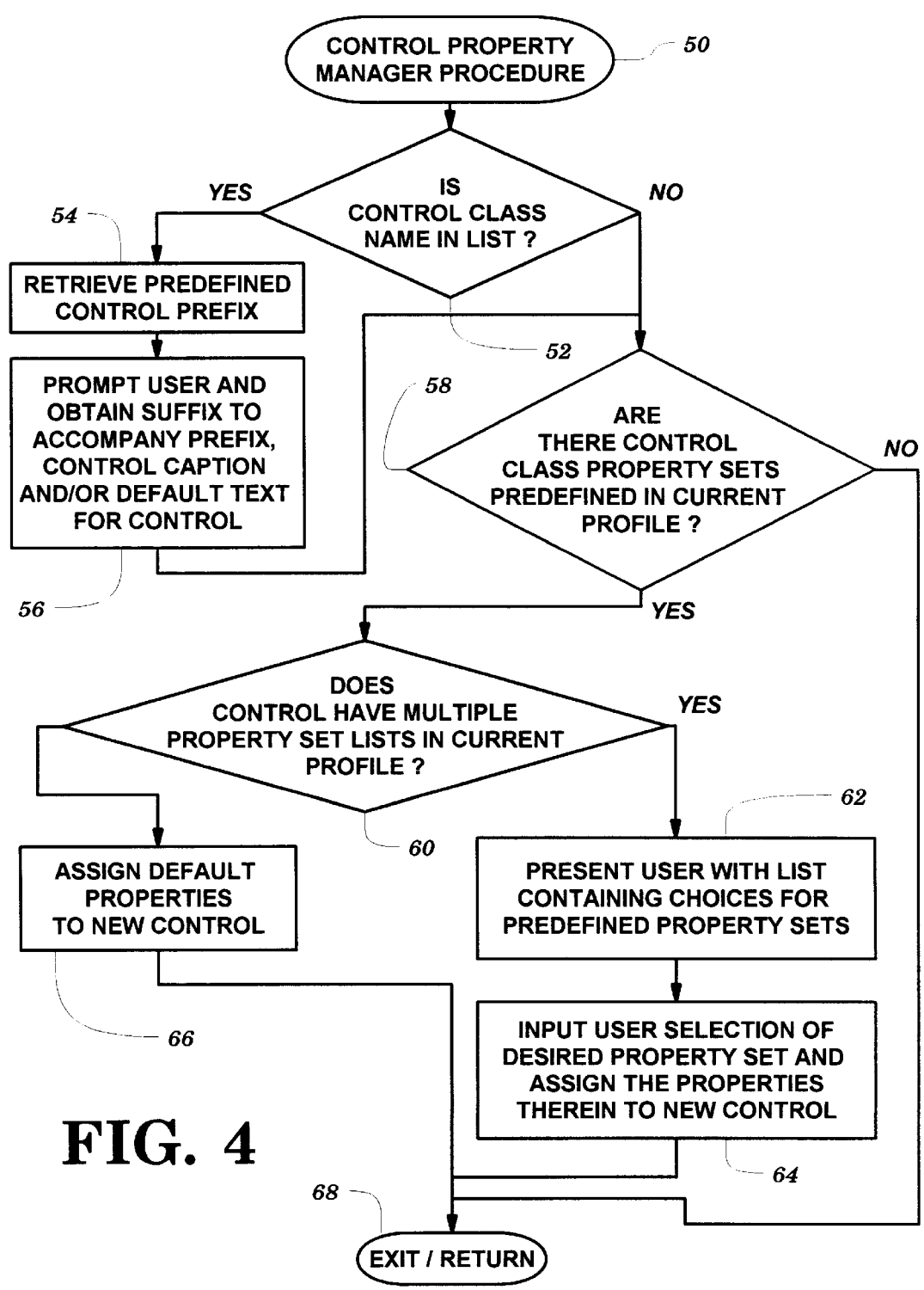
FIG. 4 is a flowchart of the control property manager procedure (block 44) of FIG. 3.

Referring now to FIG. 3, the window message hook procedure of step 28 (FIG. 2) is shown. The hook procedure begins at step 40 and consists of a simple if-then-else program construct at step 42 following step 40. When a new control or program object is being added to a program under construction in the VB environment, the Windows® OS sends a message to VB indicating the programmer has manipulated the mouse to select a new control from the toolbox (item 12 of FIG. 1) and performed a click-drag operation in the form window (item 13 of FIG. 1). The Windows® OS sends particular messages that indicate the addition of a control or object to an existing form. In adding a control to a form, VB executes an OS call to either CreateWindowEx or CreateWindow. WM_CREATE and WM_NCCREATE messages are sent to a program by the OS when an application requests that a window be created using the CreateWindowEx or CreateWindow calls to the OS. The WM_CREATE and WM_NCCREATE messages, the CreateWindow and CreateWindowEx calls are fully defined in detail in the SDK and need not be further discussed herein. When a "child" form (a window whose parent or creator is another window) or child window of VB which belongs to the "ThunderForm" class receives either the WM_CREATE or WM_NCCREATE messages, addition of a new control (such as the pushbutton 14 of FIG. 1) is detected, and step 44 executes. Both WM_CREATE and WM_NCCREATE messages include a pointer or memory reference value that enables inspection of a data structure (a CREATESTRUCT data structure) that includes the parent window handle. From a window handle, the class name of the parent window can be confirmed to be a "ThunderForm" class window. Further, the class name of the new control is accessible via the CREATESTRUCT data structure. In step 44, the property manager procedure of FIG. 4 is invoked. Following step 44, the hook procedure exits at step 46. If the message received by the hook procedure at step 42 is not either WM_CREATE or WM_NCCREATE, then step 46 follows step 42 and the hook procedure is exited. It should be noted that the hook procedure of FIG. 3 receives all messages sent by the OS to the active window, so it need not loop and wait for the next message as such functionality is inherently provided by the OS via built-in message hooking mechanisms.

It is contemplated that a software development program (such as VB) may provide a convenient "hook" or message indicating the addition of a new control in the visual design process of creating a new program. Under such circumstances, the technique for detecting the addition of a new control would be significantly simplified. It is thus contemplated that such a feature may be made available in a revised version of VB or in other software development programs that provide visual construction of the program's user interface.

Referring now to FIG. 4, a flowchart for the control property manager procedure 50, according to the present invention, is shown. At step 52, the control class name for the new control being added to the program form is ascertained by examining a data structure accessible via a memory pointer accompanying the $WM_{13}$ CREATE message (the Windows® OS provides information accompanying each message sent to an application, and in the case of the WM_CREATE message, a pointer to a CREATESTRUCT data structure is provided; the data structure defines the characteristics of the window that is about to be created, including the class name or type of window being created). Since each control or object is in reality a specialized function window of the Windows® OS, addition of a window to a window creates a parent/child window relationship. In VB, all forms are of a window of the class type "ThunderForm", and the class name for controls added to a form window or form 13 are prefixed with the word "Thunder" and suffixed with a string of characters that is predefined (by VB) for each class or type of control. For example, adding a pushbutton control to a form and examining the class name of the pushbutton control window reveals that it is of the window class "ThunderCommandButton". When a new window or control is detected as being added to a ThunderForm class window, a new control or program object is accordingly being added to a program form, thereby triggering the control property manager procedure to compare the new control class name against a list of predefined control class names in step 50. Alternatively, the ".Name" property of the new control window can be obtained with software tools such as the dwGetPropertyValue function (described infra) from Desaware. If the Name property of the new control is used as a comparison string, one must ascertain, in advance, the default names that VB assigns to each new control, extract that portion of the Name property that is identical for all controls created of a particular type or class (e.g., all pushbutton controls are named "CommandX" where X is a numeric value), and compare the extracted information to a list of control names or types previously defined in an INI file. If the name or type of the control (as indicated by the control's class name suffix or its Name property) is found in the control property list (information stored in the INI file or a database file and loaded by the control property manager as described in relation to FIG. 2) then program execution continues at step 54. If the .Name property or class type of the new control is not defined in the INI file, program execution continues at step 58.

At step 54, using the extracted name of the new control as an index into the INI file, a corresponding prefix, previously defined by the user for this type of new control or program object, is searched located in the INI file. In this instance, the prefix in the INI file listing for a CommandButton or pushbutton is "cmd". Next, at step 56, the user is prompted to enter a suffix to accompany the predefined prefix, and the prefix-suffix name is assigned to the "name" property of the control. For example, if the new control is a pushbutton control 14, the predefined prefix may be "cmd" (an abbreviation for command pushbutton), the suffix entered may be "exit" and the programmer would enter "Exit" as the text to be displayed in the text or "Caption" property area of the control. Following step 56, program execution continues with step 58. In the case of certain controls that have a text property, the default text of the control is also obtained from the user at this time. The default text is that text that appears on the pushbutton control 14 of FIG. 1.

At step 58, the current profile is used as an index into the INI file to determine whether a property set is defined for the new control in the INI file. If no property set is defined, the control property manager procedure exits following step 58. If a property set is defined in the INI file, then the quantity of property sets available for the new control in the current profile (recall the profile is selected in step 21 of FIG. 2) is next determined in step 60. If the current profile is "Printing" then only one set of property settings is found in the INI file under the [Printing:CommandButton] section, and the properties defined in that section of the INI file are assigned to the new control at step 66. If the current profile selected is "Order Entry", then two property settings are available for the new control (assuming it is a CommandButton control), and these are "Order Entry:CommandButton:Style1" and "Order Entry:CommandButton:Style2", and step 62 follows step 60. At step 62, the programmer is prompted to select one of the two choices available for the property settings of the new control, either "Style1" or "Style2" (note the prefix "Order Entry:CommandButton" may be optionally displayed to the user). Next, at step 64, a property set is selected by the user, and those properties are assigned to the new control. The control property manager procedure is exited following step 64.

Figure 5:
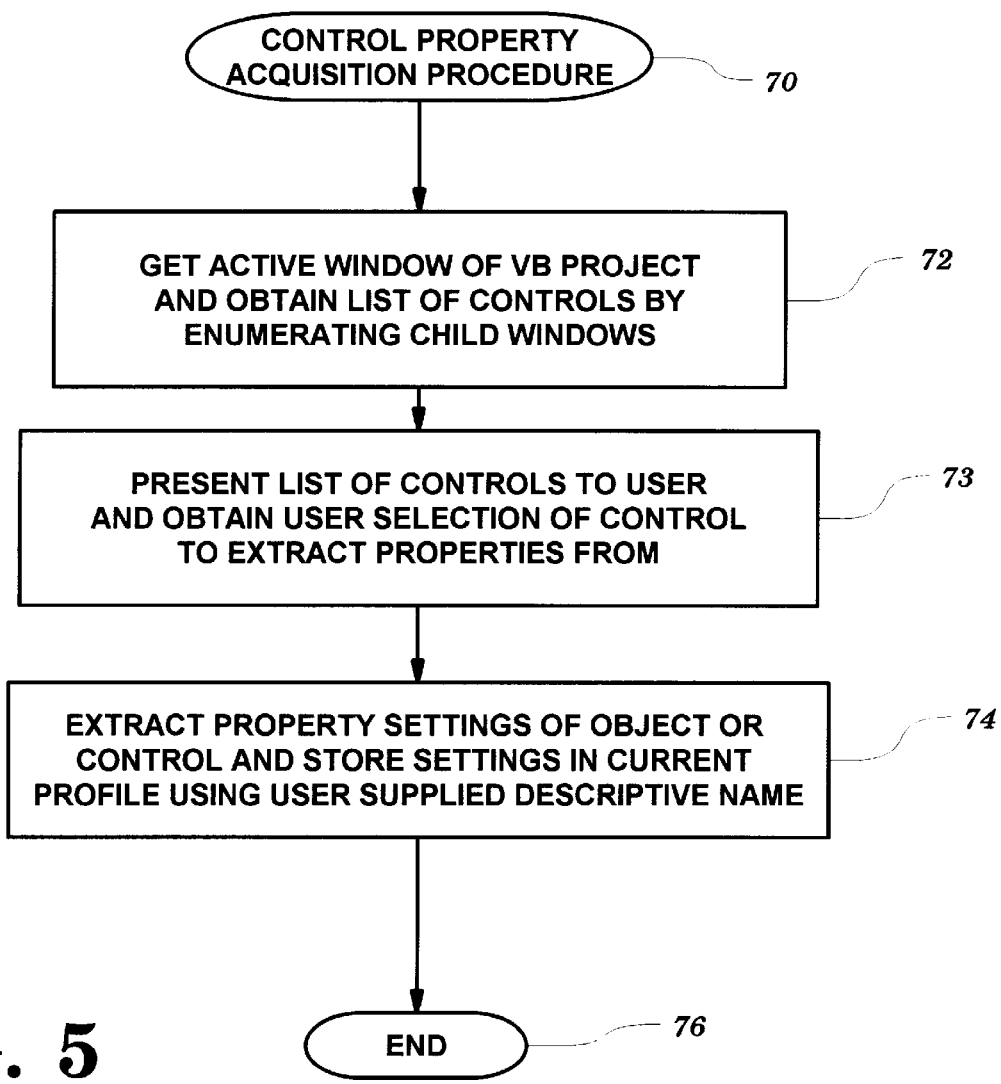
FIG. 5 is a flowchart of the property acquisition module of the program object property manager according to the present invention.

The INI file listing, following the description of the preferred embodiment, is a text file that may be edited with any common text editor program, so that the properties of controls may be established or altered by the programmer. However, it would be much more convenient if those properties could be obtained automatically and stored in the INI file when the properties of a new control have been manually established by the programmer. Accordingly, FIG. 5 depicts the property acquisition procedure that forms a part of the property setting manager according to the present invention. This procedure can be activated by any of numerous techniques, including an entry added to the "system control box menu" of a Windows® program, or by other techniques and mechanisms well known in the art.

Referring now to FIG. 5, a control property acquisition procedure is shown. At step 70 the property acquisition procedure begins. Following step 70, step 72 is next executed and the active window of VB is determined. If the active window is a form, then the child windows of the form are enumerated, using techniques well known in the art of Windows® programming. Thereafter, at step 73, a list of the child windows of the VB form are listed, and the programmer is prompted to select one of the items listed. Following step 73, at step 74, the properties of the control selected in step 73 are extracted and stored as a property set for the current profile or active profile of the property setting manager in the INI file. Optionally, the programmer is prompted to select an existing profile into which the acquired or extracted property settings should be stored within the INI file.

Many of the programming tasks described above are implemented in the VB programming language using a product known as SpyWorks-VB from Desaware, 5 Town & Country Village #790, San Jose, Calif. 95128. Table 1 lists programming functions provided by the SpyWorks-VB product used in programmatically accomplishing the functionality of the property setting manager according to the present invention. In addition, a product from Desaware known as SBCHOOK.VBX provides functionality to enable the message hooking process to hook messages sent to VB by the Windows® OS. For example, to extract properties of a control, the "dwGetPropertyValue" call is used in conjunction with the specific property of interest. To set control properties, the "dwSetPropertyValue" call is used.

TABLE 1

| Function Call | Description |
| --- | --- |
| dwXGetControl | Returns a control handle from a window (.hwnd) handle |
| dwGetPropertyValue | Returns a property value of interest |
| dwSetPropertyValue | Alters a property value of a control |
| dwXGetHwndControl | Returns Control Name property from handle to control |
| dwVBGetVersion | Returns VB version currently executing |
| dwGetInstance | Returns the instance handle of the window of interest |
| dwXGetControlName | Returns control .Name property |

It is recognized that the technology and functionality of the property setting manager can be developed and implemented using various application programming interfaces ("API's"), through use of dynamic link libraries unique to Windows® programming, and through use of programming languages such as C, C++, Visual Basic®, or Pascal. Software development systems or tools such as Delphi from Borland, Microsoft Visual C++ from Microsoft, PowerSoft PowerBuilder®, Watcom C++, Symantec C++ and various other software or computer program development packages that make use of program objects having default property settings and execute on any of a number of host operating systems are improved with the functionality provided by the property setting manager according to the present invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

INI FILE LISTING

[Prefixes]

TextBox=txt

OptionButton=opt

CommanButton=cmd

[Profiles]

Profile01=Accounting

Profile02=Printing

Profile03=Order Entry

[Accounting: CommandButton]

FontSize=9.75

FontBold=True

Height=200

Width=400

[Printing: CommandButton]

FontSize=8.25

FontBold=False

Height=175

Width=500

[Order Entry:CommandButton:Style1]

FontName=Arial

FontItalic=True

FontBold=True

[Order Entry:CommandButton:Style2]

FontName=Times New Roman

FontItalic=True

FontBold=False

What is claimed is:

1. A method for establishing alternative property settings of a computer program object comprising the steps of:

providing a computer system including a CPU, RAM, ROM, a display, and an input device for receiving input from a programmer;

providing a software development system program for use on said computer system for developing a computer program, wherein said software development system program includes a means for adding a plurality of program objects to a computer program;

detecting the addition of a program object by said software development system program to said computer program, wherein said program object is assigned a default property set by said software development system;

establishing a predefined property set for said program object wherein said predefined property set defines a collection of operational properties for said program object different from said default property set, and wherein said detecting step and said establishing step take place prior to execution of said computer program.

2. The method of claim 1 including the steps of:

displaying, on said display in response to said detecting step, a predefined name prefix for said program object;

prompting the programmer for a suffix to append to said predefined name prefix;

receiving a first input from said input device defining said suffix; and changing the name property of said program object to said predefined name prefix and said suffix.

3. The method of claim 1 including the steps of:

displaying a selection list of a plurality of predefined property sets on said display in response to said detecting step;

receiving a second signal from said input device indicating the selection of one of said plurality of predefined property sets; and establishing said current properties of said program object in accordance with said selected one of said plurality of predefined property sets.

4. The method of claim 1 including the steps of:

receiving a third signal from said input device indicating that the current property set of said program object is requested to be stored as one of said plurality of predefined property sets;

extracting said current property set for said program object; and storing said current property set as one of said plurality of predefined property sets.

5. The method of claim 1 including the steps of:

displaying a list of predefined profiles available, wherein each of said predefined profiles includes a plurality of said predefined property sets;

receiving a fourth input signal from said input device, said fourth input signal defining a selection by the programmer of one of said predefined profiles; and defining said plurality of predefined property sets in accordance with said selected one of said predefined profiles, wherein said predefined property sets available in said displaying and establishing steps are defined by said selected one of said predefined profiles.

6. The method of claim 5 wherein said selected one of said predefined profiles contains a plurality of predefined property sets for a plurality of program objects.

7. An apparatus for establishing alternative property settings of a computer program object comprising:

a computer system including a CPU, RAM, ROM, a mass storage device, a display, and an input device for receiving input from a programmer;

a software development system program executing on said computer system, wherein said software development system is used in developing a computer program, wherein said software development system program includes a means for adding a plurality of program objects to a computer program; and wherein said computer system includes:

means for detecting the addition of a program object by said software development system program to said computer program, wherein said program object is assigned a default property set by said software development system;

means for establishing a predefined property set for said program object wherein said predefined property set defines a collection of operational properties for said program object different from said default property set, and wherein said means for detecting and said means for establishing act to alter said default property set of said program object to said predefined property set take place prior to execution of said computer program.

8. The apparatus of claim 7 wherein said computer system further includes:

means for displaying, on said display in response to said detecting step, a predefined name prefix for said program object;

means for prompting the programmer for a suffix to append to said predefined name prefix;

means for receiving a first input from said input device defining said suffix; and means for changing the name property of said program object to said predefined name prefix and said suffix.

9. The apparatus of claim 7 wherein said computer system further includes:

means for displaying a selection list of a plurality of predefined property sets on said display in response to said detecting step;

means for receiving a second signal from said input device indicating the selection of one of said plurality of predefined property sets; and means for establishing said current properties of said program object in accordance with said selected one of said plurality of predefined property sets.

10. The apparatus of claim 7 wherein said computer system further includes:

means for receiving a third signal from said input device indicating that the current property set of said program object is requested to be stored as one of said plurality of predefined property sets;

means for extracting said current property set for said program object; and means for storing said current property set on said mass storage device, for later recall, as one of said plurality of predefined property sets.

11. The apparatus of claim 7 wherein said computer system further includes:

means for displaying a list of predefined profiles available, wherein each of said predefined profiles includes a plurality of said predefined property sets;

means for receiving a fourth input signal from said input device, said fourth input signal defining a selection by the programmer of one of said predefined profiles; and means for defining said plurality of predefined property sets in accordance with said selected one of said predefined profiles, wherein said predefined property sets available in said displaying and establishing steps are defined by said selected one of said predefined profiles.

12. The apparatus of claim 11 wherein said selected one of said predefined profiles contains a plurality of predefined property sets for a plurality of program objects.

* * * * *